United States Patent
Strandborg et al.

(10) Patent No.: US 12,413,856 B2
(45) Date of Patent: Sep. 9, 2025

(54) PHASE DETECTION AUTOFOCUS USING LIQUID CRYSTAL DEVICE

(71) Applicant: Varjo Technologies Oy, Helsinki (FI)

(72) Inventors: Mikko Strandborg, Hangonkylä (FI); Mikko Ollila, Tampere (FI)

(73) Assignee: Varjo Technologies Oy, Helsinki (FI)

( * ) Notice: Subject to any disclaimer, the term of this patent is extended or adjusted under 35 U.S.C. 154(b) by 113 days.

(21) Appl. No.: 18/517,535

(22) Filed: Nov. 22, 2023

(65) Prior Publication Data

US 2025/0168506 A1  May 22, 2025

(51) Int. Cl.
*H04N 23/67* (2023.01)
*G02B 5/20* (2006.01)
*H04N 23/55* (2023.01)
*H04N 23/84* (2023.01)

(52) U.S. Cl.
CPC ........... *H04N 23/672* (2023.01); *H04N 23/55* (2023.01); *H04N 23/84* (2023.01); *G02B 5/201* (2013.01)

(58) Field of Classification Search
CPC ...... H04N 23/672; H04N 23/55; H04N 23/84; H04N 23/67; G02B 5/201; G02B 5/20; G02B 5/23; G02B 5/24
See application file for complete search history.

(56) References Cited

U.S. PATENT DOCUMENTS

| | | | |
|---|---|---|---|
| 2008/0019684 A1* | 1/2008 | Shyu | G03B 17/245 396/332 |
| 2013/0342557 A1* | 12/2013 | Finlayson | H04N 1/60 358/1.9 |
| 2014/0104490 A1* | 4/2014 | Hsieh | H04N 23/51 348/375 |
| 2016/0182806 A1* | 6/2016 | Liu | H04N 23/673 348/349 |
| 2022/0021797 A1* | 1/2022 | Seeger | G09G 3/2007 |

* cited by examiner

*Primary Examiner* — Kelly L Jerabek
(74) *Attorney, Agent, or Firm* — ZIEGLER IP LAW GROUP, LLC.

(57) ABSTRACT

Disclosed is system with imaging unit(s) and processor(s), imaging unit(s) with image sensor of photo-sensitive cells; and light valve device having array of light valves. The processor(s) is configured to: control light valves to allow light to pass therethrough, while controlling remaining light valves in the array to stop allowing the light to pass therethrough, thereby casting shadows of remaining light valves on first part and second part in first set and second set of photo-sensitive cells, respectively; read out image signals from photo-sensitive cells; select pairs of photo-sensitive cells from first set and second set; for given pair, determine phase difference between image signals read out from photo-sensitive cells of first set and second set; and adjust focus distance of the imaging unit(s), based on phase differences.

14 Claims, 4 Drawing Sheets

PHASE DETECTION AUTOFOCUS USING LIQUID CRYSTAL DEVICE

TECHNICAL FIELD

The present disclosure relates to systems incorporating phase detection autofocus using light valve devices. The present disclosure also relates to methods incorporating phase detection autofocus using light valve devices.

BACKGROUND

Nowadays, with an increase in number of images being captured every day, there is an increased demand for developments in image processing to generate images having high resolution, minimal or no noise and blur, and less visual artifacts. Existing equipment and techniques for capturing such images are susceptible to having noise, colour bleeding, bright spots, and similar in the images. Resultantly, such images are blurry and/or often generated with considerable latency/delay, thereby not accurately representing the real-world environment.

The existing equipment and techniques for processing the images are inefficient in terms of generating images which accurately represents the real-world environment in a sharp (namely, detailed) manner. Conventionally, contrast detection is used to perform autofocus, in which contrast variations were determined in an image. When employing the contrast detection, an imaging processor has to scan through an entire image to determine a point which has a sharp focus (i.e., a point in the image where which is in-focus). The contrast detection, while being the simplest and cost-effective, is not time-efficient, as such determination of said point is through trial and error. That means the imaging processor is required to scan through the image several times. Such repetition uses processing resources extensively.

Therefore, in light of the foregoing discussion, there exists a need to overcome the aforementioned drawbacks.

SUMMARY

The aim of the present disclosure is to provide systems and methods incorporating phase detection autofocus using light valve devices, to facilitate automatic focusing of the system in a time-effective manner, by controlling the light valves in a dynamic manner. The aim of the present disclosure is achieved by systems and methods which incorporate phase detection autofocus using light valve devices as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides a system comprising:
  at least one imaging unit comprising:
    an image sensor comprising a plurality of photo-sensitive cells arranged on a photo-sensitive surface of the image sensor; and
    a light valve device comprising an array of light valves, wherein the array of light valves is arranged on an optical path of the photo-sensitive surface of the image sensor; and
  at least one processor configured to:
    control a plurality of light valves in said array to allow light to pass therethrough towards the photo-sensitive surface, whilst controlling remaining light valves in said array to stop allowing the light to pass therethrough, thereby casting shadows of the remaining light valves on a first part of each photo-sensitive cell in a first set of photo-sensitive cells and on a second part of each photo-sensitive cell in a second set of photo-sensitive cells;
    read out a plurality of image signals from the plurality of photo-sensitive cells;
    select a plurality of pairs of photo-sensitive cells from the first set and the second set, each pair of photo-sensitive cells comprising one photo-sensitive cell from the first set and another photo-sensitive cell from the second set;
    for a given pair of photo-sensitive cells comprising a first photo-sensitive cell from the first set and a second photo-sensitive cell from the second set, determine a phase difference between a first image signal read out from the first photo-sensitive cell and a second image signal read out from the second photo-sensitive cell; and
    adjust a focus distance of the at least one imaging unit, based on phase differences determined for the plurality of pairs of photo-sensitive cells.

In a second aspect, the present disclosure provides a method implemented by a system comprising at least one imaging unit, and at least one processor, the at least one imaging unit comprises an image sensor and a light valve device, the method incorporating phase detection autofocus using light valve device, wherein the method comprises:
  controlling a plurality of light valves in an array to allow light to pass therethrough towards a photo-sensitive surface of the image sensor, whilst controlling remaining light valves in said array to stop allowing the light to pass therethrough, thereby casting shadows of the remaining light valves on a first part of each photo-sensitive cell in a first set of photo-sensitive cells and on a second part of each photo-sensitive cell in a second set of photo-sensitive cells;

reading out a plurality of image signals from the plurality of photo-sensitive cells;

selecting a plurality of pairs of photo-sensitive cells from the first set and the second set, each pair of photo-sensitive cells comprising one photo-sensitive cell from the first set and another photo-sensitive cell from the second set;

for a given pair of photo-sensitive cells comprising a first photo-sensitive cell from the first set and a second photo-sensitive cell from the second set, determining a phase difference between a first image signal read out from the first photo-sensitive cell and a second image signal read out from the second photo-sensitive cell; and adjusting a focus distance of the at least one imaging unit, based on phase differences determined for the plurality of pairs of photo-sensitive cells.

The present disclosure provides the aforementioned system and the aforementioned method incorporating phase detection autofocus using light valve device to adjust focus in images to clearly represent a given scene in the real-world environment, in a computationally-efficient and time-efficient manner. Herein, the plurality of light valves and the remaining light valves are controlled dynamically, by selectively allowing or disallowing the light to pass therethrough. The light valves control how much light is to be incident on each of the photo-sensitive cell, and different areas of shadows casted on each of the photo-sensitive cell corresponding to each of the light valves of the remaining light valves. Beneficially, the difference in a position and a shape of the shadows casted facilitates determination of the phase difference between the first image signal and the second image signal. The phase difference is then processed by the at least one processor to adjust the focus distance, which enables generating an image which is sharp (namely, detailed) and in-focus. The plurality of image signals are read out sequentially, which is well-known in prior art. The arrangement of the image sensor and the light valve device facilitates high dynamic range (HDR) imaging to capture HDR images. Hence, a viewing experience of a user would become highly immersive and realistic, when the image is subsequently shown to the user. The system and the method are simple, robust, fast, reliable and can be implemented with ease.

Throughout the present disclosure, the term "imaging unit" refers to an apparatus for imaging the real-world environment. The imaging unit may be used for imaging real-world environments for a variety of applications including, but not limited to, extended-reality (XR), inspection of the real-world environment, machine vision, gaming, art, and so forth. Optionally, the imaging unit further comprises at least one optical element (as described later) that is to be employed for adjusting a focus distance of the imaging unit.

Throughout the present disclosure, the term "image sensor" refers to a device that detects light from a real-world environment at its photo-sensitive surface, thereby enabling the plurality of photo-sensitive cells arranged on the photo-sensitive surface to capture a plurality of image signals. The plurality of image signals are electrical signals pertaining to a real-world scene of the real-world environment. The plurality of image signals constitute the image data of the plurality of photo-sensitive cells. Herein, the term "image data" refers to information pertaining to a given photo-sensitive cell of the image sensor, wherein said information comprises one or more of: a colour value of the given photo-sensitive cell, a depth value of the given photo-sensitive cell, a transparency value of the given photo-sensitive cell, a transparency value of the given photo-sensitive cell, a luminosity value of the given photo-sensitive cell. The colour value could, for example, be Red-Green-Blue (RGB) values, Red-Green-Blue-Alpha (RGB-A) values, Cyan-Magenta-Yellow-Black (CMYK) values, Red-Green-Blue-Depth (RGB-D) values, or similar. Examples of the image sensor include, but are not limited to, a charge-coupled device (CCD) image sensor, and a complementary metal-oxide-semiconductor (CMOS) image sensor. Image sensors are well-known in the art.

It will be appreciated that the plurality of photo-sensitive cells could, for example, be arranged in a rectangular two-dimensional (2D) grid, a polygonal arrangement, a circular arrangement, an elliptical arrangement, a freeform arrangement, or the like, on the image sensor. In an example, the image sensor may comprise 25 megapixels arranged in the rectangular 2D grid (such as a 5000×5000 grid) on the photo-sensitive surface.

Throughout the present disclosure, the term "light valve device" refers to a filter which controls a transmitted spectral response. Herein, the light valve device is used to control an amount of the light to be incident on the photo-sensitive surface of the image sensor. Such controlling of the amount of light is performed by the light valve device by any one of: deflecting the light to be incident on the photo-sensitive surface, blocking the light. An example of the light valve device is a liquid crystal light valve device. Herein, the liquid crystal light valve device comprises a liquid crystal layer. This liquid crystal layer is implemented as a switching polarising filter, wherein the electrical signals are applied to voltage control the amount of light incident on the photo-sensitive surface of the image sensor, in a switching manner. Optionally, the light valve device used is a liquid crystal panel.

The light valve device comprises the array of light valves corresponding to the plurality of photo-sensitive cells, wherein the array of light valves is arranged directly in front of the plurality of photo-sensitive cells. The array of light valves is arranged in such a manner that the light to be incident on the photo-sensitive surface of the image sensor, first passes through said array. A given light valve is controlled to adjust an exposure of the image sensor by controlling a time of exposure of the image sensor. In this regard, when the given light valve is fully open, light is incident on the image sensor, which results in a bright exposure (for example, such as when capturing images during daytime). Alternatively, when the given light valve is partially closed, less light is incident on the image sensor, which results in a dark exposure (for example, such as when capturing images during night-time). It will be appreciated that the array of light valves could be arranged in a manner similar to the arrangement of the plurality of photo-sensitive cells.

Notably, the at least one processor controls an overall operation of the system. It will be appreciated that the at least one processor is communicably coupled to the image sensor and the light valve device. The at least one processor could be implemented as any one of: an image signal processor, a microprocessor, a microcontroller, or a controller. As an example, the image signal processor may be a programmable digital signal processor (DSP). As another example, the at least one processor could be implemented as an application-specific integrated circuit (ASIC) chip or a reduced instruction set computer (RISC) chip.

The at least one processor is configured to simultaneously send the electrical signals to the array of light valves in such a manner that the plurality of light valves allow the light to be incident on the photosensitive surface of the image sensor, and the remaining light valves stop the light to be incident on the photosensitive surface of the image sensor. In this regard, a given light valve of the plurality of light valves, which allows passage of light therethrough, is a transparent light valve, and another given light valve of the remaining light valves, which stops the passage of light therethrough, is a blocked (opaque) light valve. Herein, a transition edge between the given light valve and the another given light valve casts the shadow over the first part of each photo-sensitive cell in the first set of photo-sensitive cells and on the second part of each photo-sensitive cell in the second set of photo-sensitive cells, wherein the shadow is a penumbra. The term "penumbra" refers to a partially-shaded area of the shadow cast by the remaining light valves on the first part and the second part. Herein, the first part of a given photo-sensitive cell in the first set of photo-sensitive cells could be a left part and the second part of another given photo-sensitive cell in the second part of the photo-sensitive cells could be a right part. Alternatively, the first part of a given photo-sensitive cell could be a top part and the second part of another given photo-sensitive cell could be a bottom part. In other words, the first part is on an opposite side of the second part. Hence, the given photo-sensitive cell in the first part and the another given photo-sensitive cell in the second part receive photons from a part of a lens system. Herein, the system further comprises the lens system.

The plurality of image signals (as described above) are read out (namely, sampled) by the at least one processor from plurality of photo-sensitive cells from the image sensor. The at least one processor is configured to read out the plurality of image signals in a line-by-line (namely, sequential) manner. The plurality of image signals are read out to determine which photo-sensitive cells are able and not able to receive the photons on the first part and the second part. A technical effect of reading out the plurality of image signals in such a manner is that a position of the shadow casted on the first part and the second part is determined.

The pair of photo-sensitive cells is made up of the given photo-sensitive cell from the first set and the another given photo-sensitive cell from the second set. In this regard, more than one pair (i.e., the plurality) of photo-sensitive cells are selected. The at least one processor is configured to select the plurality of pairs of photo-sensitive cells in a dynamic manner based on at least one condition, for example, such as, a lighting condition in the real-world environment. For example, when the lighting condition in the real-world environment is low, the three pairs of photo-sensitive cells are selected.

Optionally, a selection of the plurality of pairs of photo-sensitive cells is reconfigurable. In this regard, the remaining light valves (that block the light) need not be fixed. The plurality of light valves (that allow the light) and the remaining light valves (that block the light) can be selected in a reconfigurable manner across frames. The term "frame" refers to individual images that form a sequence in a video. A technical benefit of selecting the plurality of pairs of photo-sensitive cells in such a manner is that it enables adjustments based on requirements of a user, for example, such as dynamically changing pairs of photo-sensitive cells based on the real-world environment, lighting conditions in the real-world environment, and similar.

Optionally, wherein the at least one processor is configured to:
  detect when a given criteria is satisfied, wherein the given criteria is satisfied when at least one of the following is true:
    (i) an average illuminance of a real-world environment is lower than a predefined threshold illuminance;
    (ii) a signal-to-noise ratio of the plurality of image signals is lower than a predefined threshold value;
  when it is detected that the given criteria is satisfied, employ at least a predefined percent of a total number of light valves in said array as the remaining light valves.

In this regard, the at least one processor is configured to determine the average illuminance of the real-world environment, optionally, by employing at least one ambient light sensor. Typically, the at least one ambient light sensors are designed to measure an amount of light present in their surroundings. The ambient light sensors are well-known in the art. Alternatively, optionally, the at least one processor is configured to determine the average illuminance of the real-world environment by calculating an average of illuminance values of pixels in at least one previous image that is captured using the image sensor. Herein, the term "average illuminance" of the real-world environment refers to an average amount of light intensity per unit area in the real-world environment. In other words, the average illuminance is an average brightness level across an area within the real-world environment, taking into account variations in light intensities across said area. It will be appreciated that the predefined threshold illuminance refers to a minimum allowable illuminance of the real-world environment, below which the environment conditions of the real-world environment are considered to be low-light/dark environment conditions. Optionally, the predefined threshold illuminance lies in a range of 50 lux to 1500 lux. The predefined threshold illuminance lies in a range of 50, 100, 200, 400, 700, or 1200 lux to 350, 850, 1150, 1350, 1450, or 1500 lux.

Furthermore, optionally, the at least one processor is configured to determine the signal-to-noise ratio of the plurality of image signals by taking into account at least one of: illuminance values of pixels in at least one previous image that is captured using the image sensor, a quality of optics (for example, such as lens, mirrors, and the like) used in a camera comprising the image sensor, an exposure time of the image sensor, a sensitivity of the image sensor, an aperture size of the image sensor, a gain condition, optical aberrations, an operating temperature of the image sensor. As mentioned above, the plurality of image signals constitute the image data. In an example, the signal-to-noise ratio of the image data could be determined using a pre-defined correlation between the signal-to-noise ratio and at least one of the aforementioned factors. Typically, the signal-to-noise ratio of the image data is a direct measure of image quality of an image that is generated upon processing said image data. The signal-to-noise ratio is useful in ascertaining a balance between useful signal, which is the image data, and an unwanted noise that can degrade said image. It will be appreciated that the predefined threshold value refers to a minimum allowable signal-to-noise ratio of the image data, below which the image data is considered to be significantly noisy. Optionally, the predefined threshold value is 45 decibels.

Once it is detected that the given criteria is satisfied i.e., when the environment conditions of the real-world environment are detected to be low-light/dark environment conditions and/or when the image data is detected to be significantly noisy, at least the predefined percent of the total number of light valves block the light from being incident on the photo-sensitive cells on the photo-sensitive surface. Herein, the predefined percent refers to a minimum number of light valves of the total number of light valves in said array as the remaining light valves. Optionally, the predefined percent lies in a range of 5 percent to 40 percent of the total number of light valves. For example, the predefined percent may be higher than 10 percent. Typically, for conventional image sensors, the predefined percent lies in a range of 5 percent to 10 percent. A technical benefit of satisfying the given criteria is that in poor lighting conditions and/or in noisy conditions, a larger number of light valves in said array can be used as the remaining light valves.

The first image signal read out from the first photo-sensitive cell and the second image signal read out from the second photo-sensitive cell are processed by the at least one processor, wherein the first photo-sensitive cell and the second photo-sensitive cell lie in proximity to each other (in other words, as close to each other as possible). However, the first photo-sensitive cell and the second photo-sensitive cell are partially occluded, wherein the occlusion is not same for each of the first photo-sensitive cell and the second photo-sensitive cell. Hence, each photo-sensitive cell can only receive light from a part of the lens system. For example, the first photo-sensitive cell can only receive light from a left half of the lens system, and the second photo-sensitive cell can only receive light from a right half of the lens system. Hence, an amount of phase difference (namely, defocus) is calculated based on a difference in brightness between the two photo-sensitive cells. It will be appreciated that the phase difference is measured in units of angular measurement, for example, such as degrees or radians.

Optionally, the at least one processor is configured to employ a neural network that resolves phase differences across multiple photo-sensitive cells of the image sensor using a phase resolving algorithm. The phase resolving algorithm takes the image signal, an information about a location and size of occlusion provided due to the light control valves of the light valve device as inputs. Subsequently, the phase resolving algorithm extracts the phase difference by estimating a phase shift in a given unit of measurement (as mentioned above). Herein, the neural network could be pre-trained to resolve the phase difference detected across the multiple photo-sensitive cells. Alternatively, the neural network could be trained using reference phase differences detected across reference photo-sensitive cells, and can then be used to resolve the phase difference between the first image signal and the second image signal. Upon training, the neural network could be able to understand complex patterns and relationships, thereby making the system reliable and robust. A technical effect of employing the neural network in such a manner is that the phase differences from multiple photo-sensitive cells are taken into account to enhance accuracy and a speed of resolving the phase differences.

Throughout the present disclosure, the term "focus distance" refers to a distance from the lens system to a point where the light converges on the photo-sensitive surface to form a sharp image on the image sensor. The at least one processor is configured to process the phase difference between the first image signal and the second image signal to determine how to shift the focus distance and in which direction, to generate an image which is in-focus. Such adjustments are made automatically (i.e., autofocus). When the adjustment is made using autofocus, the at least one processor is configured to automatically adjust the focus to achieve the focus points.

Optionally, the imaging unit further comprises at least one optical element, wherein the at least one optical element is implemented as at least one of: the lens, a mirror, a prism. Optionally, the at least one optical element is implemented as a single lens having a complex shape.

Optionally, the single lens is implemented as any one of: a Fresnel lens, a Liquid Crystal (LC) lens or a liquid lens. Alternatively, optionally, the optical element is implemented as a single mirror having a complex shape. As an example, a reflective surface of such a mirror may have an aspheric shape. Yet alternatively, optionally, the optical element is implemented as a configuration of multiple lenses and/or mirrors.

Optionally, the at least one processor is configured to:
detect, based on the phase differences, when the at least one imaging unit is focused at a given focus point; and
when it is detected that the at least one imaging unit is focused at the given focus point, process the plurality of image signals to generate at least one image.

In this regard, the imaging unit is already focused correctly, in which case the plurality of image signals can be processed to generate the at least one image. Optionally, the system further comprises a colour filter array (CFA) arranged between the image sensor and the light valve device. The term "colour filter array" refers to a pattern of colour filters arranged in front of the plurality of photo-sensitive cells of the photo-sensitive surface, wherein the CFA allows only specific wavelengths of light to pass through a given colour filter to reach a corresponding photo-sensitive cell of the photo-sensitive surface, for capturing corresponding image data. The CFA could be a Bayer CFA, a non-Bayer CFA, or similar. The CFA is well-known in the art. Therefore, the plurality of image signals have colour data, which is then processed by the at least one processor by employing demosaicking and other image signal processing (ISP) on the plurality of image signals to generate the image. It will be appreciated that the at least one processor is configured to employ at least one image processing algorithm for performing the demosaicking. Techniques for processing the plurality of image signals for generating images are well-known in the art. A technical effect of configuring the at least one processor in such a manner is that undesirable visual artifacts (such as colour bleeding) in at least one image frame is prevented, which otherwise would have been noticeable to the user when using the system.

Optionally, the at least one imaging unit further comprises a colour filter array arranged between the image sensor and the array of light valves, and wherein when processing the plurality of image signals, the at least one processor is configured to:
determine a colour value for each photo-sensitive cell, based on a corresponding image signal read out from said photo-sensitive cell; and
correct colour values for photo-sensitive cells of the first set and for photo-sensitive cells of the second set on whose respective first parts and respective second parts the shadows were casted by the remaining light valves, based on colour values determined for said photo-sensitive cells and colour values determined for their respective neighbouring photo-sensitive cells,
wherein optionally, the colour values are corrected by employing at least one neural network.

Herein, the term "colour value" (namely, intensity) is an RGB colour value. Alternatively, optionally, the colour value is a high dynamic range (HDR) colour value. Yet alternatively, optionally, the colour vale is an RGB-A colour value. In this regard, each photo-sensitive cell generates corresponding image signal in response to the light incident on the photo-sensitive surface of the image sensor. The corresponding image signal is then used to determine the colour value of each photo-sensitive cell, by taking into account characteristics of the colour filter placed over the photo-sensitive cell. A particular colour of the colour filter that corresponds to that photo-sensitive cell influences the determination of the colour value.

The photo-sensitive cells of the first set and the photo-sensitive cells of the second set are used to perform simultaneous capturing (namely, sensing) of colour image and optical depth. However, the photo-sensitive cells in the first set and the photo-sensitive cells in the second set that are used for capturing the optical depth are not present in the colour image. Hence, the at least one neural network is employed to fill gaps in the colour image by taking the respective neighbouring photo-sensitive cells and partially obscured pixel value as input. It will be appreciated that the at least one neural network is typically different from the aforementioned neural network that employs the phase resolving algorithm, because the at least one neural network is related to correcting colour values, and the aforementioned neural network is related to resolving the phase differences. A technical effect of determining and correcting the colour values for photo-sensitive cells of the first set and for photo-sensitive cells of the second set in such a manner is that the image is visually immersive when viewed by the user.

Optionally, the first part is on the opposite side of the second part, and wherein the respective neighbouring photo-sensitive cells comprise other photo-sensitive cells on which the shadows are casted in other parts that are different from the first part and the second part. In this regard, a shape of the shadow casted on such respective neighbouring photo-sensitive cells could provide useful information. Optionally, the useful information is at least one of: an optical depth information, a shape and a size of the object represented in the image, a position of light source. A technical benefit is that this information can be used for additional input in a neural network that resolves phase differences across multiple pixels. Hence, a phase resolving algorithm can be performed by employing the neural network.

Optionally, a given light valve from amongst said remaining light valves covers only a part of each photo-sensitive cell in a group of neighbouring photo-sensitive cells, wherein the given light valve is arranged on an optical path of the group of neighbouring photo-sensitive cells. In this regard, this criteria is necessary for only for the remaining light valves that block the light to be incident on the photo-sensitive surface of the image sensor and, therefore, cast their shadows on their corresponding underlying photo-sensitive cells. For the plurality of light valves that allow the light to pass through, it does not matter whether their underlying photo-sensitive cells are partially covered. In this regard, when the underlying photo-sensitive cells are fully covered, such photo-sensitive cells are not useful for phase detection. The array of the light valves are arranged in such a grid resolution and position that an amount of edges of the light valves that overlap with the underlying photo-sensitive cells are minimised, and instead maximum an amount of partially overlapped underlying photo-sensitive cells. Hence, it is not necessary that a ratio of the size of the light valves and the size of the photo-sensitive cells is 4 or some other integer. A technical effect of such arrangement is said arrangement can be used as phase detection autofocus or can emulate a depth camera.

Herein, the array of light valves can be shifted so that each light valve covers a part of multiple underlying photo-sensitive cells of the image sensor. In this regard, the array of light valves is shifted during a manufacturing process, namely only once. In other words, the array of light valves is not shifted dynamically during operation. For example, between an original position (in which a given light valve is aligned with its corresponding photo-sensitive cell) and at least one other position (in which the given light valve is not aligned with its corresponding photo-sensitive cell, but covers parts of multiple photo-sensitive cells). Alternatively, when the light valve is larger than corresponding photo-sensitive cell of the image sensor, an edge of said light valve is positioned to be in a middle of the corresponding photo-sensitive cell of the image sensor.

Optionally, the at least one imaging unit further comprises a colour filter array arranged between the image sensor and the array of light valves, the colour filter array comprising red colour filters, green colour filters and blue colour filters,
wherein the at least one processor is configured to select at least 50 percent of the remaining light valves as those light valves in said array that correspond to the blue colour filters.

In this regard, the autofocus can be performed using either mainly or only blue subpixels in the CFA pattern without comprising the perceived image quality, as human eye does not contain any blue colour-sensitive cells at the fovea region. When the CFA comprises the red colour filters, a corresponding wavelength range may be from 580 nanometres (nm) to 700 nm. When the CFA comprises the green colour filters, a corresponding wavelength range may be from 480 nm to 580 nm. When the CFA comprises the blue colour filters, a corresponding wavelength range may be from 400 nm to 480 nm. Optionally, the CFA further comprises other types of colour filters, wherein the other types of colour filters comprises at least one of: white colour filters, yellow colour filters, infrared filters. Herein, when the CFA comprises the white colour filters, a corresponding wavelength range may be from 400 nm to 700 nm. When the CFA comprises the yellow colour filters, a corresponding wavelength range may be from 570 nm to 590 nm. The aforesaid wavelength ranges may also overlap with one another.

The at least one processor is configured to select a majority portion (i.e., at least 50 percent) of the remaining light valves. The selected light valves are those that are associated with the blue colour filters. Namely, the remaining light valves that are to be controlled to stop allowing the light to pass therethrough towards the photo-sensitive surface. The light valves in the array that correspond to the blue colour filters are namely, those light valves that cast shadows on photo-sensitive cells reading out blue colour. Hence, the phase difference is detected using features emitting the corresponding wavelengths of the blue colour. A technical effect of configuring the at least one processor in such a manner is that the focus distance is adjusted by using either mainly or only blue subpixels in the CFA without compromising a perceived image quality, as the eyes of the user does not contain any cones at fovea of the eyes, that are sensitive to wavelengths corresponding to the blue colour.

Optionally, the plurality of light valves and the remaining light valves are arranged in an interleaved manner. In other words, the light valves of the array are made opaque and transparent in an alternating manner in the checkerboard pattern. A technical effect of arranging the light valves of the array in such a manner is that maximum number of photo-sensitive cells of the image sensor are partially obscured by the light valve device, and the calculation to determine the phase difference can be performed.

Optionally, the at least one processor is configured to:
for each pair of photo-sensitive cells comprising one photo-sensitive cell from the first set and another photo-sensitive cell from the second set, determine a phase difference between an image signal read out from the one photo-sensitive cell and another image signal read out from the another photo-sensitive cell; and
determine an optical depth of a corresponding three-dimensional point in a real-world environment, based on the determined phase difference and a distance between the one photo-sensitive cell and the another photo-sensitive cell.

Herein, the image signal read out from the one photo-sensitive cell and another image signal read out from the another photo-sensitive cell correspond to shadows that are casted on one part of the one photo-sensitive cell and another part of the another photo-sensitive cell. In this regard, the at least one imaging unit optionally comprises a first imaging unit and a second imaging unit, the first imaging unit comprising a first image sensor, the second imaging unit comprising a second image sensor. Subsequently, in order to determine the optical depth, the phase difference is calculated between different photo-sensitive cells that are at a distance from each other. Herein, greater is this distance, greater is an optical depth sensitivity. The optical depth can be determined with just a single camera; if a point is in focus, the optical distance is known to be equal to the focal distance of the lens system. If the point is not in focus, the amount of defocus is dependent on the distance from the point to the focal plane. As the focus is adjusted, there are multiple measurements for each point which can be resolved whether the optical distance was positive or negative.

Thereafter, a depth map can then be created by determining the optical depths of all the 3D points (that are visible) from a particular pose. Herein, the term "depth map" refers to a data structure comprising information pertaining to optical depths of objects or their portions within the real-world environment from the particular pose. Optionally, the depth map is an image comprising a plurality of pixels, wherein a colour of each pixel indicates an optical depth of its corresponding real point/region within the real-world environment. A technical benefit of determining the optical depth in such a manner is that the focus distance of the at least one imaging unit is adjusted based on the determined optical depth.

The present disclosure also relates to the second aspect as described above. Various embodiments and variants disclosed above, with respect to the aforementioned first aspect, apply mutatis mutandis to the second aspect. The method is implemented by an system comprising at least one imaging unit and at least one processor, the at least one imaging unit comprising an image sensor and a light valve device.

Optionally, the method comprises:
detecting, based on the phase differences, when the at least one imaging unit is focused at a given focus point; and
when it is detected that the at least one imaging unit is focused at the given focus point, processing the plurality of image signals to generate at least one image.

A technical effect of detecting that the at least one imaging unit is focused at the given focus point is that undesirable visual artifacts (such as colour bleeding) in at least one image frame is prevented, which otherwise would have been noticeable to the user when using the system.

Optionally, the at least one imaging unit further comprises a colour filter array arranged between the image sensor and the array of light valves, and wherein when processing the plurality of image signals, the at least one processor is configured to:
determining a colour value for each photo-sensitive cell, based on a corresponding image signal read out from said photo-sensitive cell; and
correcting colour values for photo-sensitive cells of the first set and for photo-sensitive cells of the second set on whose respective first parts and respective second parts the shadows were casted by the remaining light valves, based on colour values determined for said photo-sensitive cells and colour values determined for their respective neighbouring photo-sensitive cells,
wherein optionally, the colour values are corrected by employing at least one neural network.

A technical effect of determining and correcting the colour values for photo-sensitive cells of the first set and for photo-sensitive cells of the second set in such a manner is that the image is visually immersive when viewed by the user.

Optionally, wherein the first part is on an opposite side of the second part, and wherein the respective neighbouring photo-sensitive cells comprise other photo-sensitive cells on which the shadows are casted in other parts that are different from the first part and the second part.

A technical benefit is that information derived from the shadows casted in other parts can be used for additional input in the neural network that resolves phase differences across multiple pixels.

Optionally, wherein a given light valve from amongst said remaining light valves covers only a part of each photo-sensitive cell in a group of neighbouring photo-sensitive cells, wherein the given light valve is arranged on an optical path of the group of neighbouring photo-sensitive cells.

A technical effect of such arrangement is said arrangement can be used as phase detection autofocus or can emulate a depth camera.

Optionally, wherein a selection of the plurality of pairs of photo-sensitive cells is reconfigurable.

A technical benefit of selecting the plurality of pairs of photo-sensitive cells in such a manner is that it enables adjustments based on requirements of a user, for example, such as dynamically changing pairs of photo-sensitive cells based on the real-world environment, lighting conditions in the real-world environment, and similar.

Optionally, the method comprising:
detecting when a given criteria is satisfied, wherein the given criteria is satisfied when at least one of the following is true:
(i) an average illuminance of a real-world environment is lower than a predefined threshold illuminance;
(ii) a signal-to-noise ratio of the plurality of image signals is lower than a predefined threshold value;
when it is detected that the given criteria is satisfied, employ at least a predefined percent of a total number of light valves in said array as the remaining light valves.

A technical benefit of satisfying the given criteria is that in poor lighting conditions and/or in noisy conditions, a larger number of light valves in said array can be used as the remaining light valves.

Optionally, the at least one imaging unit further comprises a colour filter array arranged between the image sensor and the array of light valves, the colour filter array comprising red colour filters, green colour filters and blue colour filters,
wherein the method comprises selecting at least 50 percent of the remaining light valves as those light valves in said array that correspond to the blue colour filters.

A technical effect of using the colour filter array in such a manner is that the focus distance is adjusted by using either mainly or only blue subpixels in the CFA without compromising a perceived image quality, as the eyes of the user does not contain any cones at fovea of the eyes, that are sensitive to wavelengths corresponding to the blue colour.

Optionally, the plurality of light valves and the remaining light valves are arranged in an interleaved manner.

A technical effect of arranging the light valves of the array in such a manner is that maximum number of photo-sensitive cells of the image sensor are partially obscured by the light valve device, and the calculation to determine the phase difference can be performed.

Optionally, the method comprises:
for each pair of photo-sensitive cells comprising one photo-sensitive cell from the first set and another photo-sensitive cell from the second set, determining a phase difference between an image signal read out from the one photo-sensitive cell and another image signal read out from the another photo-sensitive cell; and
determining an optical depth of a corresponding three-dimensional point in a real-world environment, based on the determined phase difference and a distance between the one photo-sensitive cell and the another photo-sensitive cell.

A technical benefit of determining the optical depth in such a manner is that the focus distance of the at least one imaging unit is adjusted based on the determined optical depth.

DETAILED DESCRIPTION OF THE DRAWINGS

Figure 1A:
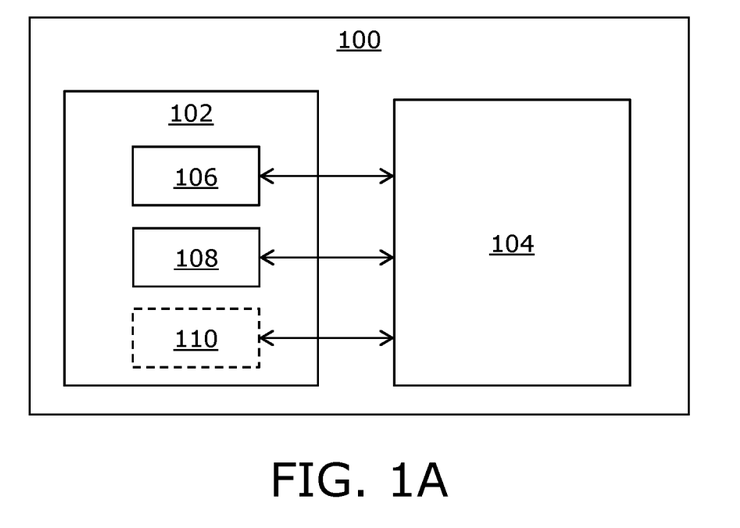
FIG. 1A illustrates a block diagram of an architecture of a system incorporating phase detection autofocus using liquid crystal devices.
Figure 1B:
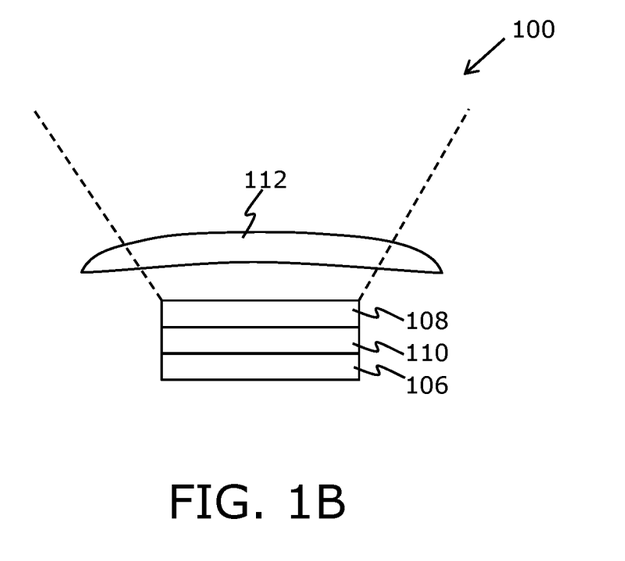
FIG. 1B illustrates an exemplary arrangement of the system, in accordance with an embodiment of the present disclosure.

Referring to FIG. 1A, illustrated is a block diagram of an architecture of a system 100 incorporating phase detection autofocus using liquid crystal devices, and referring to FIG. 1B, illustrated is an exemplary arrangement of the system 100, in accordance with an embodiment of the present disclosure. In FIGS. 1A and 1B, the system 100 comprises at least one imaging unit (depicted as an imaging unit 102) and at least one processor (depicted as a processor 104), wherein the imaging unit 102 comprises an image sensor 106 and a light valve device 108. The processor 104 is communicably coupled to the image sensor 106 and the light valve device 108 of the imaging unit 102. Optionally, the system 100 further comprises a colour filter array 110. The processor 104 is communicably coupled with the colour filter array 110. The processor 104 is configured to perform various operations, as described earlier with respect to the aforementioned first aspect.

In FIG. 1B, the system 100, optionally, further comprises a lens system 112. The processor 104 is optionally communicably coupled with the lens system 112. The colour filter array 110 is arranged directly in front of the image sensor 106. The light valve device 108 is arranged directly in front of the colour filter array 110. The lens system 112 is arranged in front of the light valve device 108.

It may be understood by a person skilled in the art that the FIGS. 1A and 1B include a simplified architecture of the system 100 for sake of clarity, which should not unduly limit the scope of the claims herein. It is to be understood that the specific implementation of the system 100 is provided as an example and is not to be construed as limiting it to specific numbers or types of image sensors and processors. The person skilled in the art will recognize many variations, alternatives, and modifications of embodiments of the present disclosure.

Figure 2:
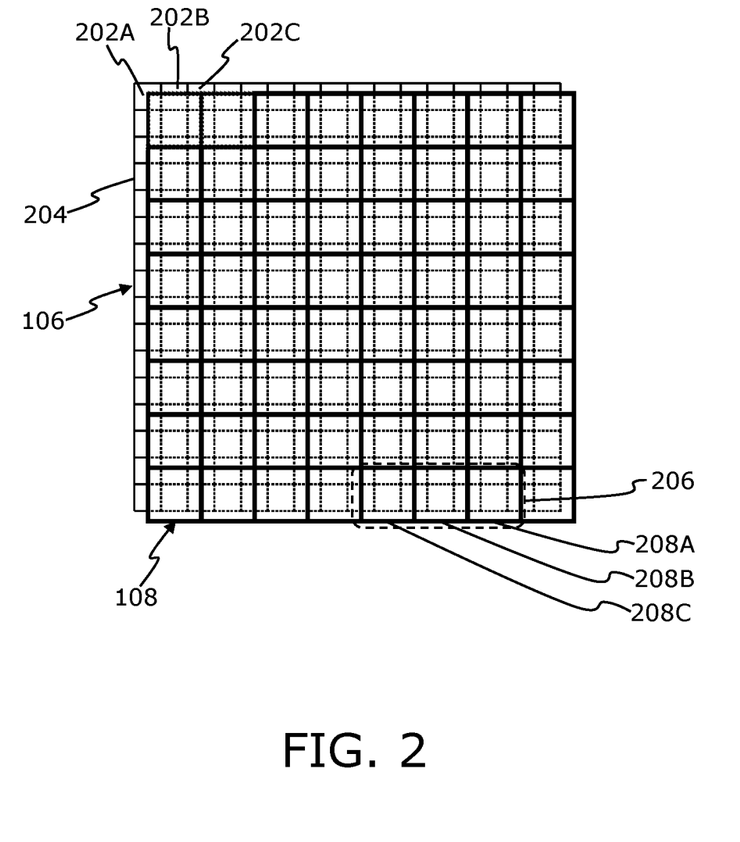
FIG. 2 shows a detailed view of the image sensor and the light valve device of FIG. 1, in accordance with an embodiment of the present disclosure.

Referring to FIG. 2, there is shown a detailed view of the image sensor 106 and the light valve device 108 of FIG. 1, in accordance with an embodiment of the present disclosure. The light valve device 108 is arranged directly in front of the image sensor 106. The image sensor 106 comprises a plurality of photo-sensitive cells (depicted as photo-sensitive cells 202A, 202B, and 202C) arranged on a photo-sensitive surface 204 of the image sensor 106. The photo-sensitive cells 202A-C are arranged in a rectangular 2D grid (depicted as a 16×16 grid) on the photo-sensitive surface 204. The light valve device 108 comprises an array 206 of light valves 208A, 208B and 208C, wherein the array 206 of light valves 208A-C is arranged on an optical path of the photo-sensitive surface 204. The light valves 208A-C are arranged in a rectangular 2D grid (depicted as an 8×8 grid).

FIG. 2 is merely an example, which should not unduly limit the scope of the claims herein. A person skilled in the art will recognize many variations, alternatives, and modifications of embodiments of the present disclosure.

Figure 3:
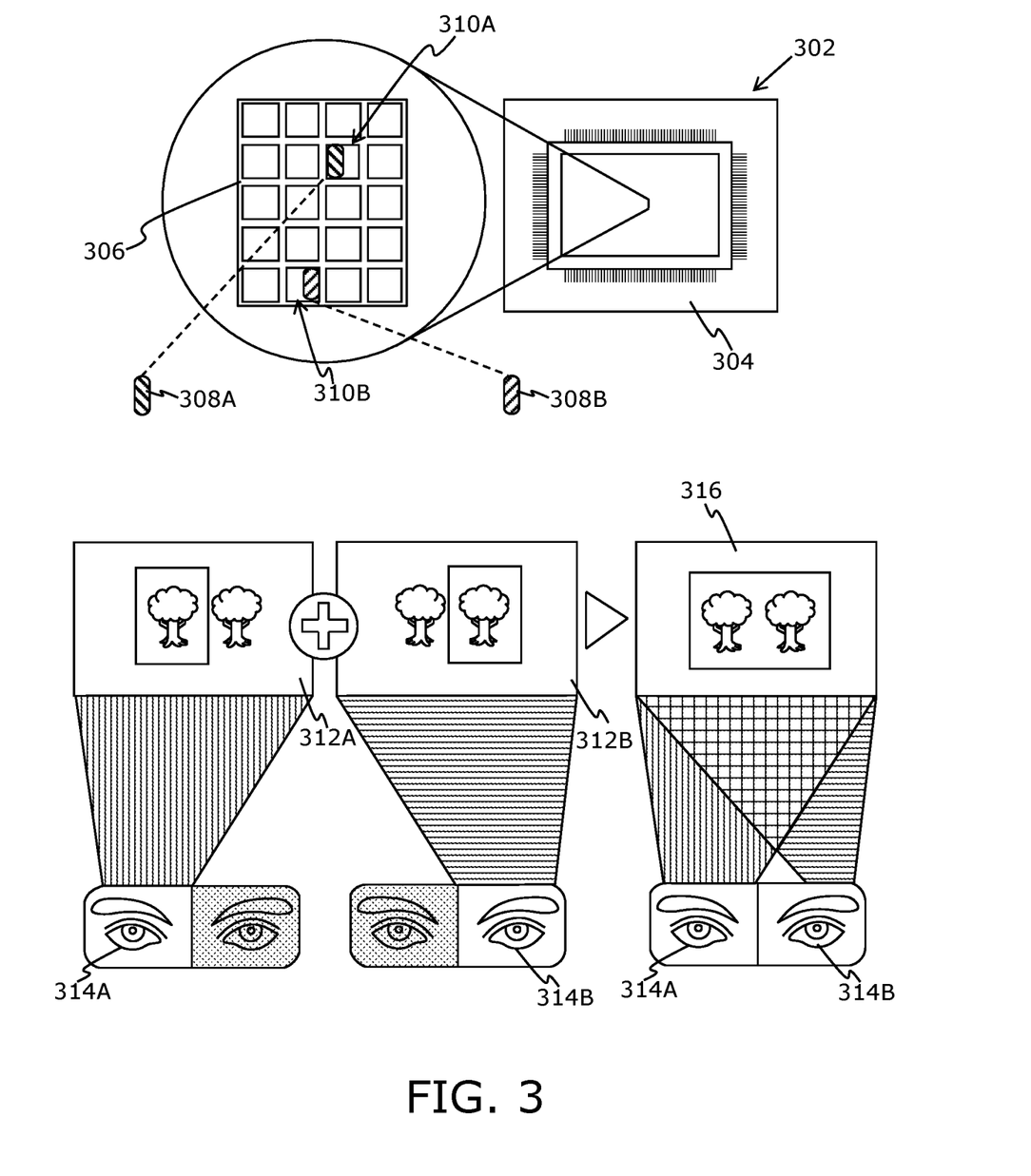
FIG. 3 illustrates an exemplary implementation of a system incorporating phase difference autofocus, in accordance with various embodiments of the present disclosure.

Referring to FIG. 3, illustrated is an exemplary implementation of a system incorporating phase difference autofocus, in accordance with various embodiments of the present disclosure. The system comprises at least one imaging unit (depicted as an imaging unit 302) and at least one processor (not shown), the imaging unit 302 comprises an image sensor 304 and a light valve device (not shown). The image sensor 304 comprises a plurality of photo-sensitive cells (depicted as a 5×4 of photo-sensitive cells) arranged on a photo-sensitive surface 306 of the image sensor 304. The light valve device comprises an array of light valves (not shown) arranged on an optical path of the photo-sensitive surface 306 of the image sensor 304. Herein, a plurality of light valves in said array are controlled to allow light to pass therethrough towards the photo-sensitive surface 306, whilst controlling remaining light valves in said array to stop allowing the light to pass therethrough. The remaining light valves hence casts shadows of the remaining light valves on a first part 308A of a photo-sensitive cell 310A in a first set of photo-sensitive cells and on a second part 308B of a photo-sensitive cell 310B in a second set of photo-sensitive cells.

Optionally, a first offset image 312A is obtained by the image sensor 304 when the shadow of the remaining light valves is casted on the first part 308A of the photo-sensitive cell 310A, wherein the first offset image 312A corresponds to a first eye 314A (namely, a right eye) of a user. The second offset image 312B is obtained by the image sensor 304 when the shadow of the remaining light valves is casted on the second part 308B of the photo-sensitive cell 310B, wherein the second offset image 312B corresponds to a second eye 314B (namely, a left eye) of a user. A plurality of image signals are read out from the plurality of photo-sensitive cells. A pair of photo-sensitive cells from the first set and the second set, i.e., the pair of the photo-sensitive cell 310A from the first set and the photo-sensitive cell 310B from the second set, is selected. Subsequently, the phase difference between a first image signal read out from the photo-sensitive cell 310A and a second image signal read out from the photo-sensitive cell 310B is determined. Consequently, the phase difference is used to generate an image 316 (i.e., which is in-focus), which is generated by adjusting a focus distance of the imaging unit 302 based on the phase difference determined for the photo-sensitive cell 310A and the photo-sensitive cell 310B.

FIG. 2 is merely an example, which should not unduly limit the scope of the claims herein. A person skilled in the art will recognize many variations, alternatives, and modifications of embodiments of the present disclosure.

Figure 4:
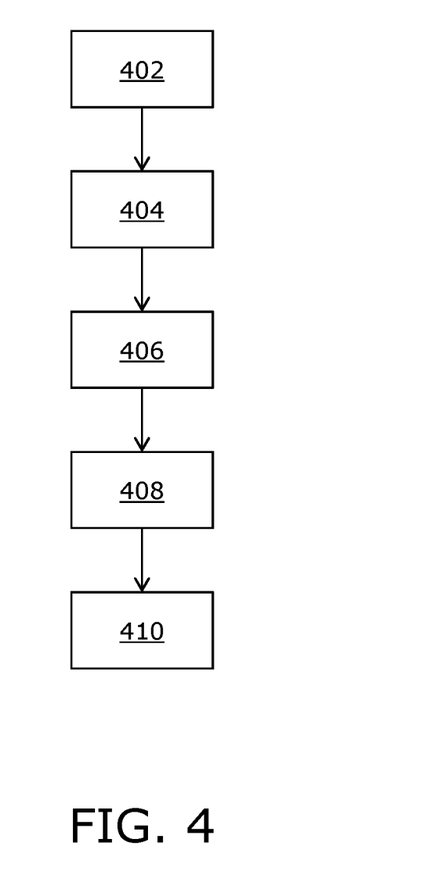
FIG. 4 illustrates steps of a method incorporating phase detection autofocus using liquid crystal device, in accordance with various embodiments of the present disclosure.

Referring to FIG. 4, illustrated are steps of a method incorporating phase detection autofocus using liquid crystal device, in accordance with an embodiment of the present disclosure. The method is implemented by a system comprising at least one imaging unit, and at least one processor, wherein the at least one imaging unit comprises an image sensor and a light valve device. At step 402, a plurality of light valves in an array is controlled to allow light to pass therethrough towards a photo-sensitive surface of the image sensor, whilst controlling remaining light valves in said array to stop allowing the light to pass therethrough, thereby casting shadows of the remaining light valves on a first part of each photo-sensitive cell in a first set of photo-sensitive cells and on a second part of each photo-sensitive cell in a second set of photo-sensitive cells. At step 404, a plurality of image signals is read out from the plurality of photo-sensitive cells. At step 406, a plurality of pairs of photo-sensitive cells from the first set and the second set are selected, each pair of photo-sensitive cells comprising one photo-sensitive cell from the first set and another photo-sensitive cell from the second set. At step 408, for a given pair of photo-sensitive cells comprising a first photo-sensitive cell from the first set and a second photo-sensitive cell from the second set, a phase difference between a first image signal read out from the first photo-sensitive cell and a second image signal read out from the second photo-sensitive cell is determined. At step 410, a focus distance of the at least one imaging unit is adjusted, based on phase differences determined for the plurality of pairs of photo-sensitive cells.

The aforementioned steps are only illustrative and other alternatives can also be provided where one or more steps are added, one or more steps are removed, or one or more steps are provided in a different sequence without departing from the scope of the claims herein.

The invention claimed is:

1. A system comprising:
   at least one imaging unit comprising:
      an image sensor comprising a plurality of photo-sensitive cells arranged on a photo-sensitive surface of the image sensor; and
      a light valve device comprising an array of light valves, wherein the array of light valves is arranged on an optical path of the photo-sensitive surface of the image sensor; and
   at least one processor configured to:
      control a plurality of light valves in said array to allow light to pass therethrough towards the photo-sensitive surface, whilst controlling remaining light valves in said array to stop allowing the light to pass therethrough, thereby casting shadows of the remaining light valves on a first part of each photo-sensitive cell in a first set of photo-sensitive cells and on a second part of each photo-sensitive cell in a second set of photo-sensitive cells;
      read out a plurality of image signals from the plurality of photo-sensitive cells;
      select a plurality of pairs of photo-sensitive cells from the first set and the second set, each pair of photo-sensitive cells comprising one photo-sensitive cell from the first set and another photo-sensitive cell from the second set;
      for a given pair of photo-sensitive cells comprising a first photo-sensitive cell from the first set and a second photo-sensitive cell from the second set, determine a phase difference between a first image signal read out from the first photo-sensitive cell and a second image signal read out from the second photo-sensitive cell; and
      adjust a focus distance of the at least one imaging unit, based on phase differences determined for the plurality of pairs of photo-sensitive cells,
   wherein the at least one processor is configured to:
      detect when a given criteria is satisfied, wherein the given criteria is satisfied when at least one of the following is true:
         (i) an average illuminance of a real-world environment is lower than a predefined threshold illuminance;
         (ii) a signal-to-noise ratio of the plurality of image signals is lower than a predefined threshold value;
      when it is detected that the given criteria is satisfied, employ at least a predefined percent of a total number of light valves in said array as the remaining light valves.

2. The system of claim 1, wherein the at least one processor is configured to:
   detect, based on the phase differences, when the at least one imaging unit is focused at a given focus point; and
   when it is detected that the at least one imaging unit is focused at the given focus point, process the plurality of image signals to generate at least one image.

3. The system of claim 2, wherein the at least one imaging unit further comprises a colour filter array arranged between the image sensor and the array of light valves, and wherein when processing the plurality of image signals, the at least one processor is configured to:
   determine a colour value for each photo-sensitive cell, based on a corresponding image signal read out from said photo-sensitive cell; and
   correct colour values for photo-sensitive cells of the first set and for photo-sensitive cells of the second set on whose respective first parts and respective second parts the shadows were casted by the remaining light valves, based on colour values determined for said photo-sensitive cells and colour values determined for their respective neighbouring photo-sensitive cells,
   wherein optionally, the colour values are corrected by employing at least one neural network.

4. The system of claim 3, wherein the first part is on an opposite side of the second part, and wherein the respective neighbouring photo-sensitive cells comprise other photo-sensitive cells on which the shadows are casted in other parts that are different from the first part and the second part.

5. The system of claim 1, wherein a given light valve from amongst said remaining light valves covers only a part of each photo-sensitive cell in a group of neighbouring photo-sensitive cells, wherein the given light valve is arranged on an optical path of the group of neighbouring photo-sensitive cells.

6. The system of claim 1, wherein a selection of the plurality of pairs of photo-sensitive cells is reconfigurable.

7. The system of claim 1, wherein the at least one imaging unit further comprises a colour filter array arranged between the image sensor and the array of light valves, the colour filter array comprising red colour filters, green colour filters and blue colour filters, wherein the at least one processor is configured to select at least 50 percent of the remaining light valves as those light valves in said array that correspond to the blue colour filters.

8. The system of claim 1, wherein the plurality of light valves and the remaining light valves are arranged in an interleaved manner.

9. The system of claim 1, wherein the at least one processor is configured to:
for each pair of photo-sensitive cells comprising one photo-sensitive cell from the first set and another photo-sensitive cell from the second set, determine a phase difference between an image signal read out from the one photo-sensitive cell and another image signal read out from the another photo-sensitive cell; and
determine an optical depth of a corresponding three-dimensional point in a real-world environment, based on the determined phase difference and a distance between the one photo-sensitive cell and the another photo-sensitive cell.

10. A method implemented by a system comprising at least one imaging unit, and at least one processor, the at least one imaging unit comprises an image sensor and a light valve device, the method incorporating phase detection autofocus using light valve device, wherein the method comprises:
controlling a plurality of light valves in an array to allow light to pass therethrough towards a photo-sensitive surface of the image sensor, whilst controlling remaining light valves in said array to stop allowing the light to pass therethrough, thereby casting shadows of the remaining light valves on a first part of each photo-sensitive cell in a first set of photo-sensitive cells and on a second part of each photo-sensitive cell in a second set of photo-sensitive cells;
reading out a plurality of image signals from the plurality of photo-sensitive cells;
selecting a plurality of pairs of photo-sensitive cells from the first set and the second set, each pair of photo-sensitive cells comprising one photo-sensitive cell from the first set and another photo-sensitive cell from the second set;
for a given pair of photo-sensitive cells comprising a first photo-sensitive cell from the first set and a second photo-sensitive cell from the second set, determining a phase difference between a first image signal read out from the first photo-sensitive cell and a second image signal read out from the second photo-sensitive cell; and
adjusting a focus distance of the at least one imaging unit, based on phase differences determined for the plurality of pairs of photo-sensitive cells;
detecting when a given criteria is satisfied, wherein the given criteria is satisfied when at least one of the following is true:
(i) an average illuminance of a real-world environment is lower than a predefined threshold illuminance;
(ii) a signal-to-noise ratio of the plurality of image signals is lower than a predefined threshold value;
upon detecting that the given criteria is satisfied, employing at least a predefined percent of a total number of light valves in said array as the remaining light valves.

11. The method of claim 10, the method comprising:
detecting, based on the phase differences, when the at least one imaging unit is focused at a given focus point; and
when it is detected that the at least one imaging unit is focused at the given focus point, processing the plurality of image signals to generate at least one image.

12. The method of claim 11, wherein the at least one imaging unit further comprises a colour filter array arranged between the image sensor and the array of light valves, and wherein at the step of processing the plurality of image signals, the method comprising:
determining a colour value for each photo-sensitive cell, based on a corresponding image signal read out from said photo-sensitive cell; and
correcting colour values for photo-sensitive cells of the first set and for photo-sensitive cells of the second set on whose respective first parts and respective second parts the shadows were casted by the remaining light valves, based on colour values determined for said photo-sensitive cells and colour values determined for their respective neighbouring photo-sensitive cells,
wherein optionally, the colour values are corrected by employing at least one neural network.

13. The method of claim 10, wherein the at least one imaging unit further comprises a colour filter array arranged between the image sensor and the array of light valves, the colour filter array comprising red colour filters, green colour filters and blue colour filters,
wherein the method comprises selecting at least 50 percent of the remaining light valves as those light valves in said array that correspond to the blue colour filters.

14. The method of claim 10, the method comprising:
for each pair of photo-sensitive cells comprising one photo-sensitive cell from the first set and another photo-sensitive cell from the second set, determining a phase difference between an image signal read out from the one photo-sensitive cell and another image signal read out from the another photo-sensitive cell; and
determining an optical depth of a corresponding three-dimensional point in a real-world environment, based on the determined phase difference and a distance between the one photo-sensitive cell and the another photo-sensitive cell.

* * * * *